United States Patent [19]

Brown

[11] 3,838,416

[45] Sept. 24, 1974

[54] DIGITAL/ANALOG SUBTERMINAL

[75] Inventor: Anthony Kevin Dale Brown, Ottawa, Ontario, Canada

[73] Assignee: Northern Electric Company, LImited, Montreal, Quebec, Canada

[22] Filed: July 2, 1973

[21] Appl. No.: 375,836

[52] U.S. Cl. ...................... 340/347 DA, 179/15 BD
[51] Int. Cl. .......................................... H03k 13/20
[58] Field of Search ................ 340/347 DA; 325/13; 328/164; 179/15 AD, 15 BD, 15 AL

[56] References Cited

UNITED STATES PATENTS

| | | | |
|---|---|---|---|
| 2,912,508 | 11/1959 | Hughes | 179/15 BD |
| 3,040,130 | 6/1962 | Hughes | 179/15 BD |
| 3,160,874 | 12/1964 | Hamori | 340/347 DA |
| 3,165,588 | 1/1965 | Holzer et al. | 179/15 BD |
| 3,180,939 | 4/1965 | Hall | 179/15 |
| 3,483,323 | 12/1969 | Kawashima et al. | 178/70 |
| 3,671,875 | 6/1972 | Pento | 328/129 |
| 3,737,585 | 6/1973 | Ghosh | 179/15 AD |

OTHER PUBLICATIONS

"Single Channel Drop and Insert" Telecommunications Applications Canadian Marconi Co. Sept. '73 pp. 41–44.

*Primary Examiner*—Malcolm A. Morrison
*Assistant Examiner*—Vincent J. Sunderdick
*Attorney, Agent, or Firm*—John E. Mowle

[57] ABSTRACT

A digital/analog subterminal in a digital transmission system in which the total number of quantizing levels of the analog signal is less than the total number of digits per frame so that the quantizing control signal can be derived directly from the recovered digital clock signal without the necessity for separately controlled quantizing control generators.

3 Claims, 2 Drawing Figures

DIGITAL/ANALOG SUBTERMINAL

This invention relates to a digital/analog terminal for a digital transmission system and more particularly to an intermediate terminal for a single channel in a time-division multiplex (TDM) pulse code modulation (PCM) system.

BACKGROUND OF THE INVENTION

Pulse code modulation communication systems are now well established as a means for conveying analog voice signals between two terminals over a TDM carrier system. The general history and theory of such systems is discussed at length in "Principles of Pulse Code Modulation" by K. W. Cattermole, Iliffe Books Ltd., London 1969. Considerable development of an operational PCM system has been carried out in the United States of America by Bell Telephone Laboratories under the designation T1-D2 carrier transmission system. This system has 24 speech channels, each having an 8-bit binary code. The channels are sampled at an 8 KHz rate and then assembled in time-division multiplex. With the addition of one extra bit per frame for synchronization, this yields a total bit rate of 1.544 Mb/s for this system. Such systems may then be multiplexed up into higher order systems such as T2, T3 and T4. Multiplexing such carrier systems is described in "Transmission Systems for Communications" by Bell Telephone Laboratories, 4th edition, and in "Telesis" Vol. 2 No. 6, Fall 1972 published by Bell-Northern Research Ltd.

In many long distance PCM transmission systems in which a number of repeater stations are employed, it is often desirable to utilize one or more channels for order wire or local signalling purposes. To be economical, the drop of a single channel must be achieved with minimal analog-to-digital (a/d) and digital-to-analog (d/a) translating equipment at each repeater station. Several types of coders are discussed at length in chapter 4 of Cattermole. Of these the counting type lends itself to logarithmic compression and/or expansion of the analog signal which is often desirable for transmitting voice signals. In addition to deriving frame, channel and clock signals from the composite PCM signal, it is also necessary to provide quantizing control signals for such d/a and a/d counting-type coders. An understanding of this requirement can be obtained from the above-mentioned text by Cattermole at pp 321 to 336. Heretofore, it has been found that the need for independently generating these latter signals has added considerably to the cost and complexity of such a subterminal.

STATEMENT OF THE INVENTION

It has been discovered that if the total number of quantizing levels is less than the total number of digits per frame, then the quantizing control signal can be derived directly from the recovered digital clock signal.

Thus, in a digital transmission system for transmitting a pulse train of recurrent pulses, divided into a plurality of channels each including a plurality of encoded information digits; the invention provides a digital/analog terminal for one of the channels comprising: circuitry for deriving frame, channel and digit synchronization information from the pulse train, also circuitry for generating a quantizing control signal from the synchronization information. A counting decoder circuit under control of the quantizing control signal may then be utilized to translate the incoming digital information to an analog output signal in said one channel; and/or a counting encoder circuit under control of the quantizing control signal may be utilized to translate an analog input signal to an outgoing digital information signal for insertion in said one channel.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
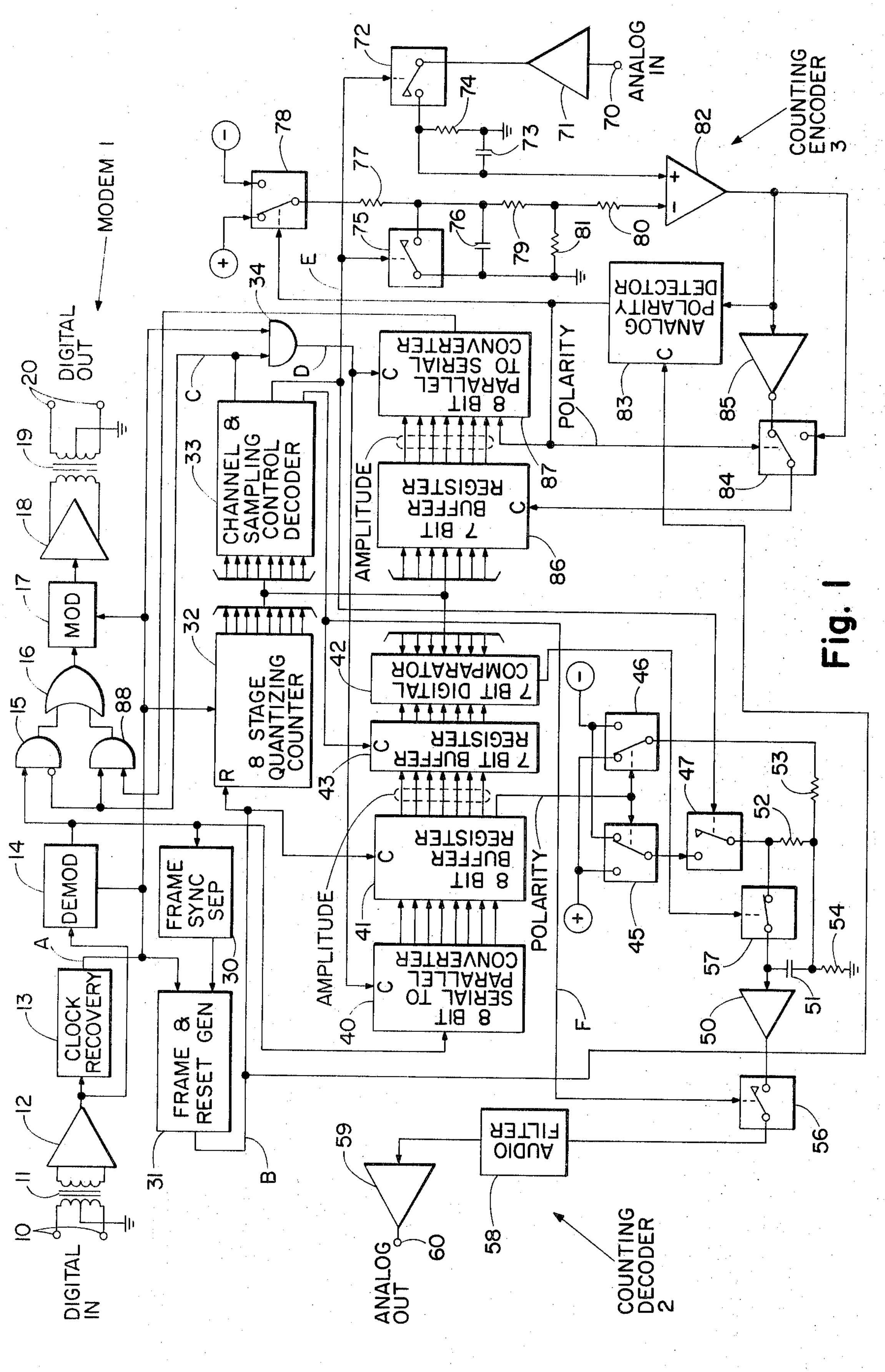
FIG. 1 is a block and schematic circuit diagram of a digital/analog subterminal for a selected channel in a digital transmission system.

In the following example embodiment, the pulse train will follow the standard T1-D2 format developed by Bell Telephone Laboratories and described in the above-mentioned texts. In the T1-D2 PCM carrier system, incoming analog voice signals are encoded into 24 voice channels each having 8 digits at a sampling rate of 8 KHz. Seven bits or digits provide $2^7$=128 encoding levels while the eighth digit determines the polarity of the analog signal. With an additional digit for frame synchronization, the total number of channel bits per frame equals $8 \times 24 + 1 = 193$. At an 8 KHz sampling rate, this yields a digital rate of $193 \times 8K = 1.544$ Mb/s.

Commencing on page 329 of the above-mentioned text by Cattermole, a technique is described for providing logarithmic compression of the analog signal employing a simple RC network. Owing to the exponential form of the compression characteristic which is symmetrical for positive and negative going samples, it is convenient to encode the PCM signal using one bit, e.g. the first bit, of the 8-bit PCM word to indicate the sample polarity and the remaining 7 bits to encode the sample amplitude (from the zero signal level). The coding function is then resolved into two parts consisting of a polarity detector and an amplitude quantizer. The seven bits available for amplitude quantization allow for $2^7$=128 discrete sample levels to be determined; thus, the analog sample is encoded into the nearest approximate digital word. Using a counter type encoder, a counter is required which counts to 128 during the sample encoding period, (i.e., the period between samples). At an 8 KHz sampling rate, the period between samples is 125 $\mu$sec. To allow time for taking a sample before encoding begins, the counter must be capable of counting up to 128 in less than 125 $\mu$sec. This means that the counter clock rate must be greater than $128 \times 8$ KHz = 1.024 MHz. The essence of the present invention is the utilization of the recovered clock which has a digital line bit rate of 1.544 MHz. When this clock is extracted from the line and utilized to drive the encoder or decoder, the counter will count up to 128 in approximately 82.9 $\mu$sec, which allows $125 - 82.9$ or 42.1 $\mu$sec. for sampling the analog signal. It has been found that this sampling interval of 42.1 $\mu$sec. is adequate for sampling the analog signal in encoding, and deriving the analog signal during decoding. It will be evident however that while the above system is described in terms of the T1-D2 carrier system, the principles of the invention are applicable to any digital transmission system including those in which a number of T1-D2 carrier systems are time division multiplexed to higher order systems.

In a typical system, transmission of the digital signal is by conditioned diphase modulation or by bipolar modulation, each of which has its inherent advantages and characteristics. However, the type or use of any modulation while included in the following description, is not basic to the present invention.

A typical application of the present invention is in a long haul PCM transmission system in which order wire or alarm facilities are required at various points between the end terminals. In the usual application, it is necessary to drop or add by decoding or encoding, a single channel in the PCM carrier system. Such additions would take place at one or more intermediate repeater stations along the carrier system and consequently it is necessary to provide all the required timing signals at each site with a minimum of equipment and cost.

Figure 2:
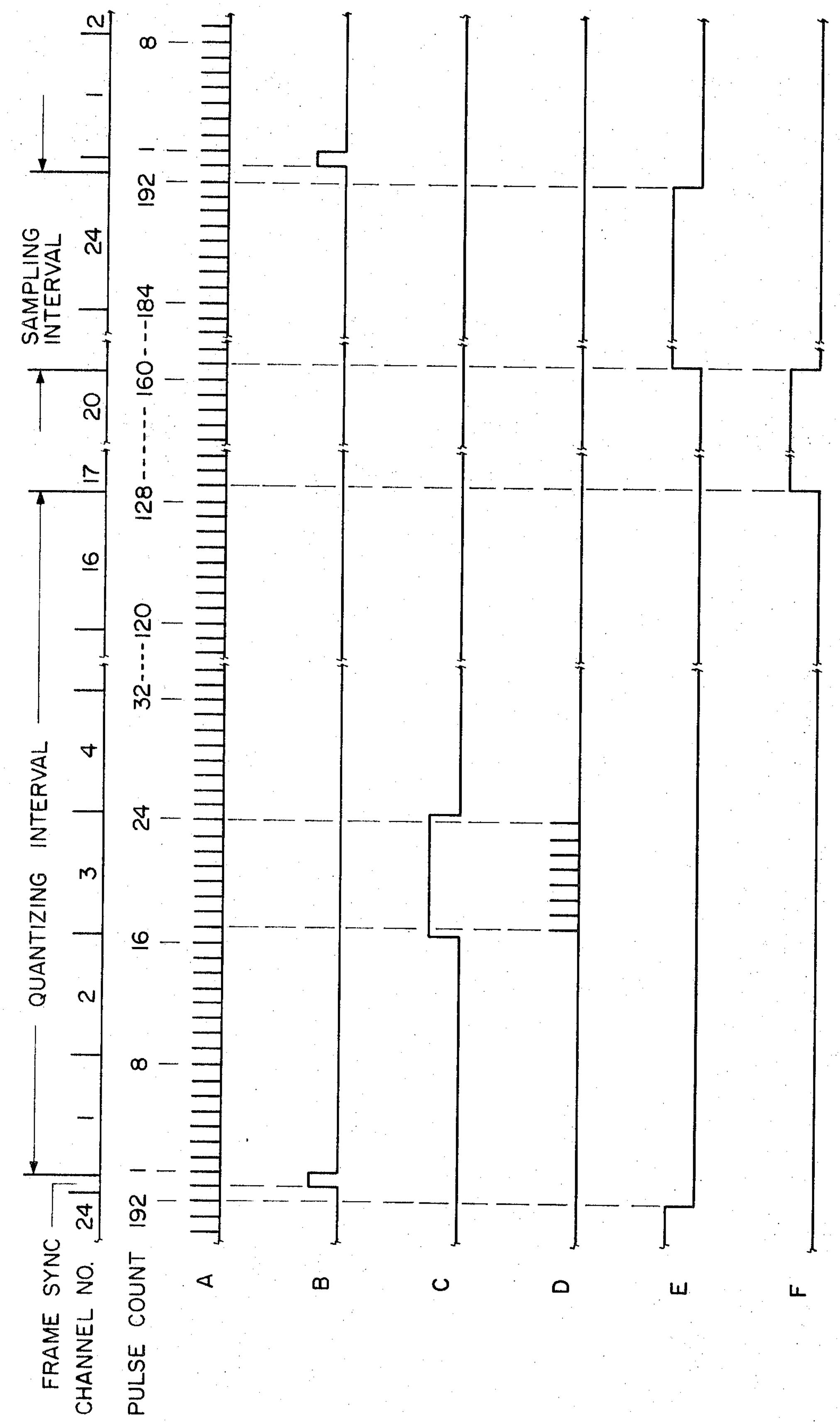
FIG. 2 illustrates a number of control waveforms at various points throughout the schematic illustrated in FIG. 1.

The various reference characters of FIG. 1 identify the location of the corresponding pulse control waveforms illustrated in FIG. 2. In this example embodiment, channel 3 has been selected for the order wire service which is reflected in the waveforms illustrated in FIG. 2. It will however be apparent that any one of the 24 channels could be selected for the order wire service. The digital/analog subterminal can be divided into three basic sections: a modulator/demodulator or modem, generally 1; a counting decoder, generally 2; and a counting encoder, generally 3. The detailed structure of each of the sections of the digital/analog subterminal will become readily apparent from the following circuit description of its function and operation.

MODEM

A modulated incoming digital pulse train at a 1.544 Mb/s rate is coupled from input terminals 10 through a transformer 11 to an amplifier 12. The output of the amplifier 12 is fed to a clock recovery circuit 13 of the fly wheel oscillator type which is used to extract the 1.544 MHz clock signal A. The output of the amplifier 12 is also fed to a demodulator 14 which is gated by the clock signal A to produce at its output a demodulated binary pulse train.

The demodulated pulse train is fed to one input of an AND gate 15. All incoming digital information from the demodulator 14 is coupled through the AND gate to one input of an OR gate 16, except during the presence of the channel 3 gating pulse C which acts as an inhibit pulse when fed to an inverted input of the AND gate 15. The output of the OR gate 16 is coupled to a modulator 17 which is gated by the clock signal A to produce a modulated output at 1.544 Mb/s. This output is in turn fed through an amplifier 18, a transformer 19 to output terminals 20 of the digital/analog subterminal.

The digital pulse train from the demodulator 14 is also fed to a frame synchronization separator 30, the output of which is fed to a frame and reset generator 31 which is gated by the clock signal A to produce at its output a reset pulse B the leading edge of which is coincident with the 193rd or frame synchronization pulse of clock waveform A. The clock signal A is also used to drive a quantizing counter 32 which is essentially an 8-stage divider that is reset every 193rd pulse by reset pulse B. The multiple outputs from the quantizing counter 32 are fed in parallel to multiple inputs of a channel and sampling control decoder 33 which produces channel 3 gating pulse 0 at one output and sampling control pulses E and F at two other outputs respectively. The channel 3 gating pulse C is ANDed with the clock signal A in an AND gate 34 to produce at its output channel 3 control pulses D.

COUNTING DECODER

The demodulated digital information in channel 3 is gated at control input C by the control pulses D into an 8-bit serial-to-parallel converter 40, the parallel outputs of which are fed to an 8-bit buffer register 41. The digital information is periodically transferred from input to output of the register 41 at the beginning of each frame by the reset pulses B which are fed to its control input C. The first bit of the 8-bit word or polarity information signal is connected from the buffer register 41 to two oppositely connected polarity switches 45 and 46, each of which are connected to positive and negative sources of potential. During the sampling period, the sampling control signal E closes a sampling control gate 47 which applies the appropriately connected potential sources (as determined by the switch 45) to the input of an amplifier 50. This charges up a capacitor 51 through a closed gate 57, the former of which forms part of an exponential deca/network that also includes resistors 52, 53 and 54.

Meanwhile the remaining seven bits of the 8-bit word, which determine the amplitude of the decoded analog signal are connected to a 7-bit buffer register 43 where they are stored until the end of the sampling period and the quantizing period which follows it. During the quantizing period the stored seven bits are compared on a bit-by-bit basis with the bits from the first seven outputs of the quantizing counter 32 in a 7-bit digital comparator 42 until coincidence is reached; whereupon an output signal is generated from the comparator 42. As a result, the quantizing counter 32 provides a measure of the period beginning from the frame reset pulse B and ending with coincidence between the two digital signals. This period corresponds to the time taken for the exponential decay network to discharge from a maximum analog value to the particular analog sample value.

At the end of the sampling period, the gate 47 is opened and the capacitor 51 commences to discharge exponentially through the resistors 52, 53 and 54 towards the potential source of opposite polarity which is connected through the polarity switch 46. The time constant of the exponential decay network is selected so that the input voltage to the amplifier 50 decays in accordance with a $\mu$-law, as explained by Cattermole, pp 329-331. The input voltage to the amplifier 50 would reach the zero crossing coincident with a count of 128 from the quantizing counter 32 provided the gate 57 was kept closed.

Coincidence between the two inputs to the digital comparator 42 generates an output signal which opens gate 57 so that the capacitor 51 remains charged at that particular value of the analog sample voltage. This analog sample voltage is buffered by the amplifier 50 and resampled by a gate 56 controlled by the short sampling pulse F, whence it is applied to an audio filter 58 to remove the sampling frequency components. The resulting analog signal is presented to a final buffer amplifier 59 so as to derive the order wire voice signal for channel 3 at the analog output 60. It will be apparent that the stored voltage on the capacitor 51, which is coupled through the amplifier 50 and the gate 56 to the filter 58, will depend directly upon the interval of time after resetting the buffer register 41 before coincidence is obtained in the digital comparator 42. Thus, the present circuit provides a countertype decoder in which the quantizing control signal is obtained directly from the derived clock signal A without the necessity for separate clock signal generators.

COUNTING ENCODER

An input order wire voice signal is connected from analog input 70 through a voice frequency amplifier 71 to a sampling gate 72. The sampling gate 72 is closed during the latter half of each frame by the sampling control signal E for an interval of about 20 μsec. at an 8 KHz rate. When the signal E is applied to the gate 72, a capacitor 73 is charged up to the analog signal level. Upon removal of the sampling control signal E, the capacitor 73 commences to discharge exponentially through a shunt resistor 74. Coincident with the above sequence, a control gate 75 is closed by the sampling control signal E thereby discharging a capacitor 76 to ground. Upon opening of the gate 75, the capacitor 76 commences to charge exponentially through a resistor 77 from either a positive or negative source of potential which is controlled by a polarity gate 78 as hereinafter explained. The exponentially rising voltage across the capacitor 76 is then coupled through a resistive pad comprising series resistors 79 and 80 and a shunt resistor 81 to the negative input of a differential comparator 82 which also has its positive input connected across the capacitor 73. The comparator 82 switches at the point where its input terminals reverse polarity. During the preceding sampling interval the comparator 82 output is fed to an analog polarity detector 83 which reads the analog polarity at the output of comparator 82 when the reset pulse B occurs (at the end of the sampling interval). The output polarity signal from the polarity detector 83 in turn controls the polarity gate 78 and also provides the outgoing digital polarity information on the eighth bit. The polarity signal is also used to control an output control gate 84 which is fed from an inverted signal passing through an inverter amplifier 85 or a non-inverted signal fed directly from the differential comparator 82. The output control signal from the gate 84 is used to transfer the 7-bit digital count of the quantizing counter 32 from a buffer register 86 to the input of an 8-bit parallel-to-serial converter 87. This digital count corresponds to the time elapsed for the exponential decay of the analog sample to the reference potential counting in equal periods of time from the frame reset pulse B. Thus, this digital number is the PCM word translation of the analog sample. As mentioned above, the quantizing counter 32 is reset to zero at the beginning of each counting interval. Hence all clock signals for the quantizing counter 32 and the associated logic are derived from the recovered 1.544 Mb/s incoming pulse stream.

The 7-bit PCM word from the buffer register 86 is combined with the analog polarity information to form an 8-bit PCM word in the converter 87. This 8-bit parallel word is then serially outputted from the converter 87 during the channel 3 time slot under control of the control pulses D, into an AND gate 88 which is coincidently opened by the channel gating pulse C. The signal then passes through the OR gate 16 to the modulator 17 as explained previously with respect to the balance of the incoming pulse train. This therefore provides a counting type a/d converter which utilizes the incoming pulse train to indirectly provide all the quantizing control signals for the converter without the necessity of separate clocks at the subterminal.

A more complete understanding of an exponential a/d and d/a converter can be obtained from the above-mentioned text by Cattermole, pp 329-336. In order for the time constants of both converters to be identical, the following are the relative values of the pertinent resistors and capacitors associated with the exponential charging and discharging networks.

| Resistor No.'s | | Relative Value |
|---|---|---|
| 52=74=77=80 | = | R |
| 81 | = | r |
| 79 | = | R-r |
| 53/54 | = | μ-1 |
| Capacitor No.'s | | |
| 51=73 | = | C |
| 76 | = | 2C |

The time constants determine the correct value of μ for the T1-D2 system, thus for a μ=255, and a counting rate of 1.544 MHz, RC=14.95 μsec. The value of the resistor 81 determines the sensitivity of the AID converter.

As will be evident, it is necessary that the total number of pulses per frame be at least as great as the total number of quantizing levels. In the present embodiment, this has been readily achieved since the total digits per frame (193) is greater than the total number of quantizing levels (128). If however this were not the case the objectives of the present invention might be met by inserting a frequency multiplier which is driven from the recovered clock signal A. Another alternative using a lower clock frequency would be to use two (or more) coders operating in succession on a single analog channel.

What is claimed is:

1. In a digital transmission system for transmitting a pulse train of recurrent frames divided into a plurality of channels each including a plurality of information digits;

a digital/analog terminal for one of said channels comprising:

means for deriving frame and digit synchronization pulses from said pulse train;

means responsive to at least some of said digit synchronization pulses during each frame, for generating quantizing control pulses;

counting decoder means for deriving an analog output signal voltage, the amplitude of which is a function of the time required to obtain numerical coincidence between the number of quantizing control pulses generated during a frame and the incoming digital number in said one channel; and/or counting encoder means, for deriving a digital number for insertion in said one channel which is equal to the total number of quantizing control pulses that are generated during a time interval which is a function of the amplitude of an analog input signal voltage.

2. In a digital transmission system for transmitting a pulse train of recurrent frames divided into a plurality of channels each including a plurality of information digits;

an intermediate digital/analog terminal for one of said channels, comprising:

means for recovering frame and digit synchronization pulses from said pulse train;

quantizing counting means responsive to at least some of said digit synchronization pulses for generating quantizing control pulses;

means for decoding the quantizing control pulses to obtain channel and sampling control signals;

coincidence means for determining coincidence between the incoming digital number in said one channel and the number of digits of said quantizing control pulses during a frame to obtain a time variable coincidence signal which is proportional to the number of said quantizing control pulses;

decoder means for deriving an analog output signal which is a function of the period of said time variable coincidence signal;

encoder means for deriving, following the period of said sampling signal, a time variable control signal, the period of which is a function of the amplitude of an analog input signal;

register means for storing the instantaneous count of said quantizing control pulses occurring during the period of said time variable control signal to generate outgoing information digits representative of the total of said instantaneous count;

means timed by said channel control signal for inserting said outgoing information digits in said pulse train.

3. A digital/analog subterminal for a selected channel in a digital transmission system which transmits a pulse train of recurrent frames divided into a plurality of channels each including a plurality of information digits in which one of said digits identifies the polarity of the analog signal and the balance the amplitude of said analog signal, the total number of digits per frame being greater than the total number of quantizing levels of the analog signal; said digital/analog subterminal comprising:

means for recovering digit and frame synchronization pulses from said pulse train;

quantizing counter means responsive to at least some of said digit and frame synchronization pulses for generating quantizing control pulses during each frame;

means for determining coincidence between the incoming digital number in said one channel and the number of the digits of said quantizing control pulses during a frame to obtain a time variable coincidence signal, the signal period being proportional to the instantaneous amplitude of an analog output signal;

decoder means for deriving said analog output signal, the amplitude of which is proportional to the period of said time variable coincidence signal, and the polarity of which is responsive to the state of said one digit;

encoder means for deriving a time variable control signal, the period of which is proportional to the amplitude of an analog input signal;

register means for storing the instantaneous count of said quantizing control pulses occurring during the period of the time variable control signal to generate information digits representative of the instantaneous amplitude of said analog input signal;

polarity generating means for generating an additional digit representing the instantaneous polarity of said analog input signal; and means for gating said information digits and said additional digit into said selected channel.

* * * * *